United States Patent [19]
Koepele, Jr.

[11] Patent Number: 5,943,605
[45] Date of Patent: Aug. 24, 1999

[54] ARRANGEMENT FOR CONTROLLING EXTRACTION OF DATA FROM A BROADBAND DIGITAL STREAM EMPLOYING A SYMBOL TABLE FOR TRANSLATING SYMBOLIC PROGRAM NAMES TO PROGRAM AND CHANNEL NUMBERS

[75] Inventor: John Curtis Koepele, Jr., Aurora, Ill.

[73] Assignee: Lucent Technologies Inc., Murray Hill, N.J.

[21] Appl. No.: 08/843,529

[22] Filed: Apr. 16, 1997

[51] Int. Cl.⁶ .............................. H04H 1/02; H04N 7/10; H04N 7/00
[52] U.S. Cl. ............................. 455/6.2; 348/10; 348/461
[58] Field of Search ................................. 348/906, 6, 10, 348/11, 460, 461, 726, 731; 455/3.1, 4.1, 4.2, 6.1, 6.2; 345/326, 327; H04N 7/10, 7/00

[56] References Cited

U.S. PATENT DOCUMENTS

| | | | |
|---|---|---|---|
| 5,539,920 | 7/1996 | Menand et al. | 348/10 X |
| 5,600,378 | 2/1997 | Wasilewski | 348/10 X |
| 5,666,293 | 9/1997 | Metz et al. | 455/3.1 X |
| 5,734,589 | 3/1998 | Kostreski et al. | 348/6 X |
| 5,768,539 | 6/1998 | Metz et al. | 348/10 X |

Primary Examiner—Andrew I. Faile
Assistant Examiner—John W. Miller
Attorney, Agent, or Firm—Werner Ulrich

[57] ABSTRACT

An arrangement for enhancing the process of extracting data from a broadband video digital data stream. The data structure specified in the standards is enhanced by the addition of a symbol table which translates between a symbolic name of a program and the corresponding program number of the program and the channel on which the program is being broadcast. Advantageously, any program may be broadcast over any channel and a symbolic naming convention which can be designed to avoid conflicts among independent designer groups can be utilized. The programs referred to above are either the entertainment programs such as motion pictures or software programs for controlling a set top terminal.

6 Claims, 3 Drawing Sheets

ARRANGEMENT FOR CONTROLLING EXTRACTION OF DATA FROM A BROADBAND DIGITAL STREAM EMPLOYING A SYMBOL TABLE FOR TRANSLATING SYMBOLIC PROGRAM NAMES TO PROGRAM AND CHANNEL NUMBERS

TECHNICAL FIELD

This invention relates to arrangements or controlling the selection of data to be extracted from a broadband digital video stream.

Problem

In recent years, the communications between a video server transmitting information on a coaxial cable or fiber optic cable to a large number of video terminals has been greatly enhanced through the use of intelligent interfaces between the transmission medium and the video monitors. This intelligent interface, usually referred to as a set top terminal (STT), broadly performs the functions of navigating, i.e., determining which portions of the digital bit stream on the communications medium are to be acquired, and acquisition, i.e., the process of downloading the appropriate section of the acquired data to some destination, usually either the memory of the STT or a playback unit for controlling a video monitor.

Once a requested video program or other signal stream has been specified to the STT, a standard specification is available to extract that video program or other signal stream from the broadband signal delivered to the user. A problem of the prior art is that the navigation process as provided in the 1994 MPEG-2 (Motion Picture Encryption Group-2) standard is insufficiently flexible in the areas of acquiring control programs for controlling STT operations such as acquiring extended pay-per-view (EPPV) video recordings under simplified control of the user of the STT, and that control programs are generally restricted to a single channel.

Solution

The above problem is alleviated, and an advance is made over the prior art in accordance with applicant's invention wherein a new data structure, called a symbol table, is introduced, that does not violate the MPEG-2 standard, for controlling acquisition of programs and/or data from the broadband medium: the symbol table includes symbolic names for use by the designers of control software to specify a requested data or control program; the symbol table data structure accommodates any requested control program or control data structure transmitted over any channel.

In accordance with one specific embodiment of applicant's invention, each section of computer program text or display text such as is used for a film is found via an entry in the symbol table. Each entry comprises a type identifier, (hexadecimal 80 for computer program text); a section length field indicating a total number of bytes in the symbol section and a symbolic title up to 168 bytes long for identifying the program in a language meaningful to the programmer and/or user; and, a channel and program identifier, or a packet identifier for directly accessing text in the same channel. Advantageously, by identifying programs and data structures by a symbolic title, it is possible to avoid the potential conflicts and administration associated with having to insure that different sources of programs and data do not conflict in their numbering, or be required to appear on the same channel. Advantageously, a shift of channels can be installed by specifying a channel number different from the current channel. Advantageously, the user may identify a wanted program by its title, when the title is displayed in a menu; thereafter, conventional menu display techniques are used to allow the user to select those portions of programs or data which are needed at any one time in order to carry out the functions requested by the user. Advantageously, a different program on a different channel can be specified without changing the name in the calling program.

DETAILED DESCRIPTION

Figure 1:
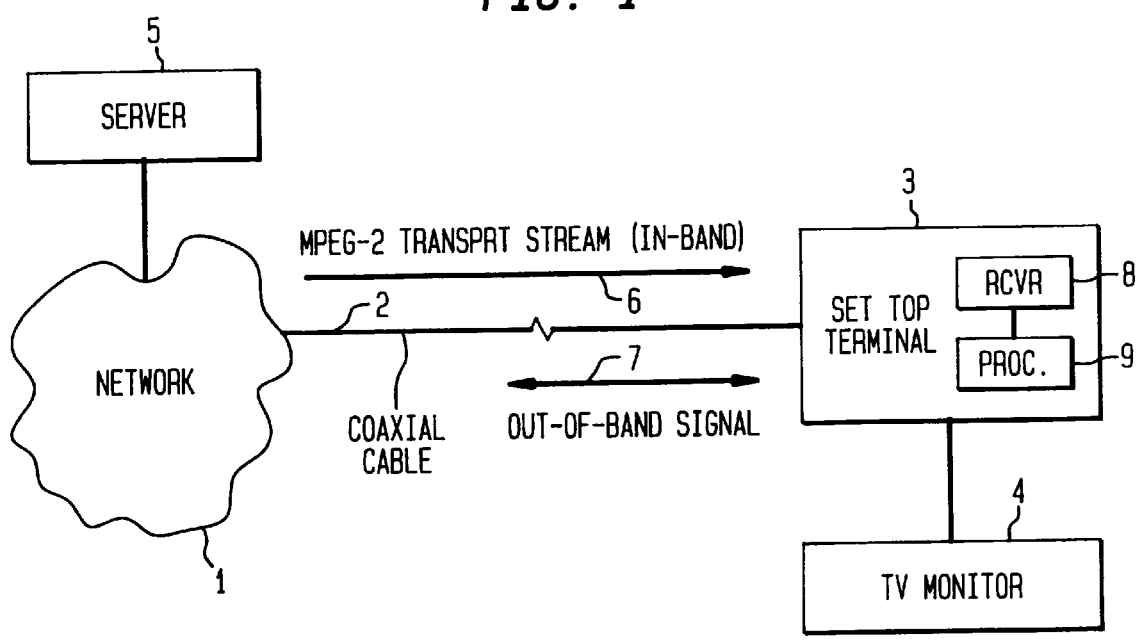
FIG. 1 is a block diagram illustrating the application of applicant's invention.

FIG. 1 describes the setting for applicant's invention. A server 5 connected via a network transmit an in-band transport stream which is in accordance with the MPEG-2 standard. This stream goes over coaxial cable 2 to set top terminals such as set top terminal (STT) 3. The set top terminal comprises a receiver 8 for receiving signals and a control processor 9 for controlling the processing of received signals. The set top terminal decodes information sent over the coaxial cable and if the information represents a video display, transmits video control signals to TV monitor 4.

The signals sent over an MPEG-2 transport stream 6 are sent over one of a plurality of channels and within each channel on one of a plurality of programs. Information is sent on MPEG-2 packets which are limited in length to 188 bytes and each packet includes a program identifier header which identifies the particular program being transmitted in that packet. Thus, the bit stream corresponding to a particular program is a series of packets, each having an identifier for packets of that program in the packet and each being transmitted over the same channel. In addition to the basic MPEG-2 transport stream which is a broadcast transport stream in the sense that all set top terminals receive the same programs on that stream, there is a two way communication (out of band) signal 7 for transmitting much smaller quantities of data between specific set top terminals and the server. These out of band signals can be used for such purposes as transmitting billing information to the server, receiving specific key information in order to receive a pay per view video program, or controlling the playback (e.g., reverse, fast forward) of a video stream.

The object of applicant's invention is to provide a more flexible arrangement for accessing program text and data on the broadcast transport stream.

Figure 2:
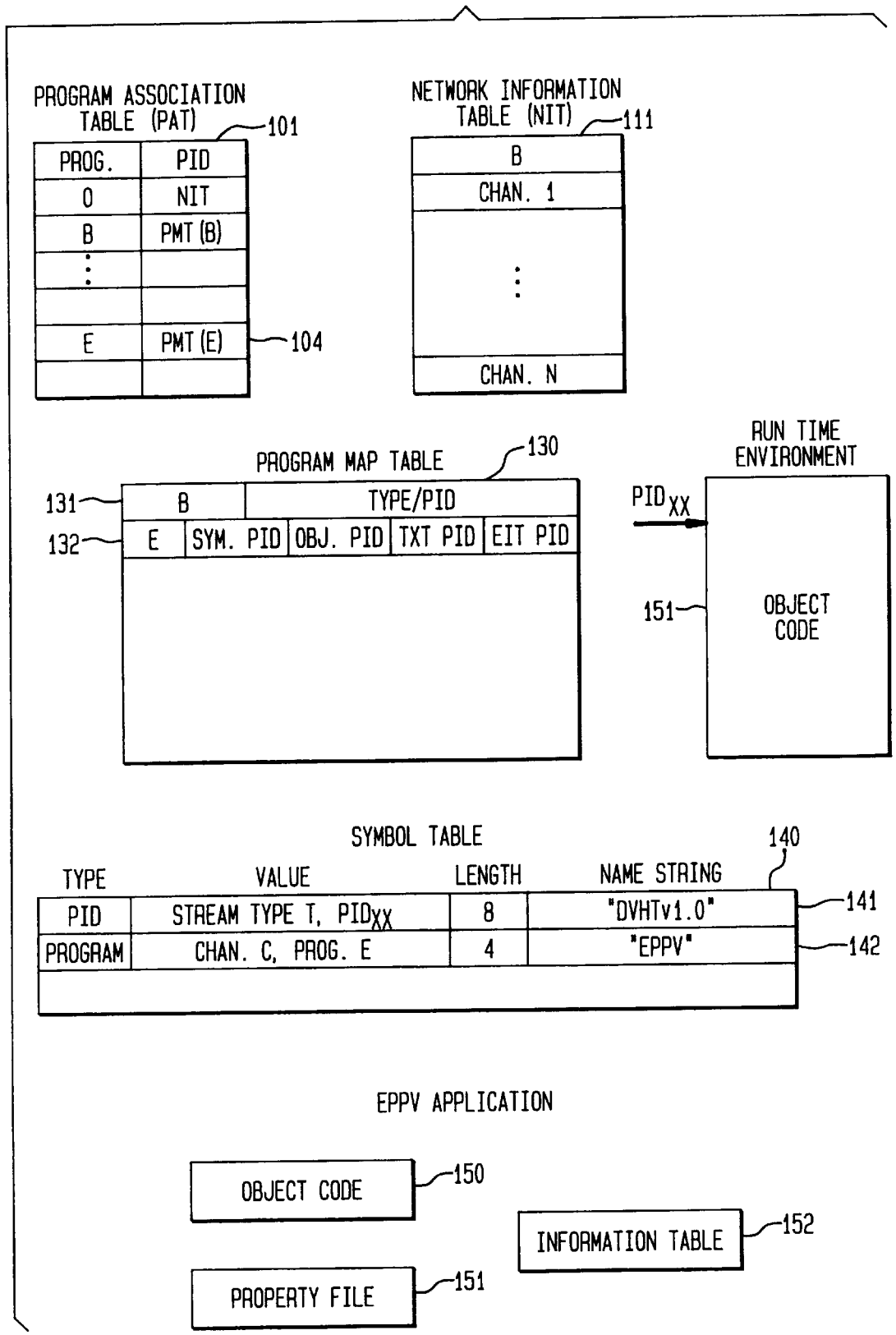
FIG. 2 is a memory layout supporting applicant's invention.

FIG. 2 illustrates the inter-relationship among the various data blocks transmitted over an MPEG-2 transport stream. Many of the blocks are essentially identical with comparable blocks in the MPEG-2 standard; applicant's invention lies in the characteristics of the symbol table (SYM), a new table added by the inventor.

The set top terminal is originally initialized with an operating system and a set of parameters for executing commands received over either the in-band or the out-band signal. Under the control of the operating system using these parameters and in response to data received on the MPEG-2 transport stream application, a run time environment (RTE) can be acquired from the MPEG-2 transport stream. The applications can then be run under the control of the operating system with its parameters and the run time environment.

The navigation process in order to determine what identifying information is needed in order to extract the proper elements from the transport stream is illustrated by the data structures FIG. 2. The initial data which must be acquired from the MPEG-2 transport stream for any channel is a program association table (PAT) 101. PAT 101 is found in channel C (the Channel used for initialization) and has a packet identifier of (decimal) 16. The identity of channel C and packet identifier 16 is part of the code that is initially stored in the STT. This is essentially the only hard coded identifier that directly specifies an address. The operating system code steers the STT program to examine the initial entry of the PAT, which is zero, and to obtain the corresponding 13-bit packet identifier. This packet identifier identifies the packet in which network information table (NIT) 111 is transmitted. The initial entry in this network information table is a number B identifying an initialization program. On other channels, the NIT is also acquired and its initial entry is B or some other program number. (The other entries in that NIT are the identities of the channels that the STT can access.) The STT then searches the PAT to find the number B and, corresponding to that number, it finds another packet identifier (PID). This identifier points to one or more entries in a program map table (PMT) 130.

Each entry in the program map table is one packet. The control program searches the PMT section identified by the PID obtained from the PAT until it finds a packet containing the number B, in PMT entry 131. The packet that contains the number B in the PMT contains only a single type field and a packet identifier. In this case, the type field is hexadecimal 80 indicating a symbol table packet identifier and the data stream identified by the packet identifier contains the first (141) of the indicated entries in the symbol table (140 SYM).

The reason for having a packet identifier that points to the symbol table instead of a packet identifier for a new time environment program is to allow the specific run time environment program, specified as a symbol in the operating system and appropriate to the particular STT, to be acquired.

A single packet identifier identifies many symbol table entries and in one preferred embodiment, identifies the full symbol table of a channel. The symbol table data stream is searched by looking for a match with a symbol, in this case, "DVHTv1.0," a symbol which has been provided by the operating system or a set top terminal application. DVHTv1.0 stands for Digital Video Home Terminal, version 1.0; the string is found in entry 141 of the symbol table. The program corresponding to the DVHTv1.0 symbol is identified by the packet identifier PIDxx, the packet identifier of the run time environment (RTE) program. The (RTE) program is used to control the STT after the initial booting steps.

Each entry in the symbol table consists of a fixed length portion (5 bytes) and a variable length portion limited to 168 bytes. The fixed length portion indicates a type (whether this is a packet identifier or a program (i.e., a video display). The first entry 141 indicates that the type is a packet identifier (hexadecimal 80). For a packet identifier type, the next three bytes indicate the type of stream (symbol table, read only data, or executable object code) in a final byte and 13-bit packet identifier in the next two bytes. The next byte represents the length of the symbol string, in this case, 8, the length of the symbolic name "DVHTv1.0".

Under the control of the operating system, the correct symbol table entry 141 is found by matching the string "DVHTv1.0" with the corresponding string stored in the operating system. Once this entry has been found, the value of the packet identifier, PIDxx is used to access the object code of the run time environment (RTE) programs.

For a second example of the contents of the symbol table, consider program number E. The program number E is found in the symbol table entry 142, which has the identifying string "EPPV" (Enhanced Pay Per View). The identifying string is stored in the object code of the run time environment program 150. When the need to obtain the EPPV control program and its associated data tables is recognized, the symbol table 140 is searched for a name string "EPPV". This search finds entry 142, which indicates that the entry is for a program and provides the channel (C) and program number (E). The program number is then used for searching the program association table (entry 104) which provides a packet identifier to locate the proper program map table (PMT) entry 132. The PMT entry 132 for program number E provides a symbol table packet identifier, an object program packet identifier to find the EPPV object program 150 for manipulating the EPPV files, a text program packet identifier to find the contents of the property file 151 for a script to be executed by the EPPV object program, and a packet identifier to find the EPPV information table.

The value in the entry 142 is channel C, program E. Since this is the same channel as the channel used for the initialization, it is not necessary to change channels. If it were necessary to change channels then following the change of channels, the program association table of the new channel would have to be consulted in order to find program number E; the entry for program number E would point to the program map table entry for program number E. The number "E" (i.e., the number of the EPPV program) is used to search the program association table in order to find a packet identifier (in entry 104 of the program association table) that points to program map table entry 132 for E. As previously stated, the program number E is found from the symbol table entry 142, which has the identifying string "EPPV" (Enhanced Pay per View). This identifying string is stored, for example, in the object code of the run time environment program 151. When the need to obtain the EPPV control program and its associated data tables is recognized, the symbol table 140 is searched for a name string "EPPV". This search finds entry 142, which indicates that the entry is for a program and provides the channel (C) and program number (E). The program number is then used for searching the program associations table (entry 104) which provides a packet identifier to locate the proper program map table entry 132.

The advantage of this arrangement is that references to content or data within executing software can be made by their symbolic names. It is straightforward to have symbolic naming conventions which will prevent the use of the same symbolic name for two programs. It is, of course, more convenient to talk about programs using the symbolic name, and the text of this symbolic name can then be found in the program text of the calling program. Different symbols can be used for programs on different channels; this is much more difficult if direct numerical program references are used.

The advantage of using a symbolic name is in the operations and maintenance of the broadband digital service. The value corresponding to a symbol can be reassigned without otherwise changing the software; no recompilations are required as the details of the service are altered. Changes are then made only by changing the content of the broadcast data stream.

The symbols are set up when the software is created and are encoded into the program. The value corresponding to a symbol can then be changed without changing the program. The symbol table approach simplifies the work of the software designers and service provider.

Note that program number B whose program number is specified in the network information table in accordance with requirements of MPEG-2 is a special case; few, if any, other program have their own program number so specified. In the more general case, the program number, if needed, is specified in accordance with applicant's invention by the symbol table as in the case of the pay-per-view application (program number E).

Figure 3:
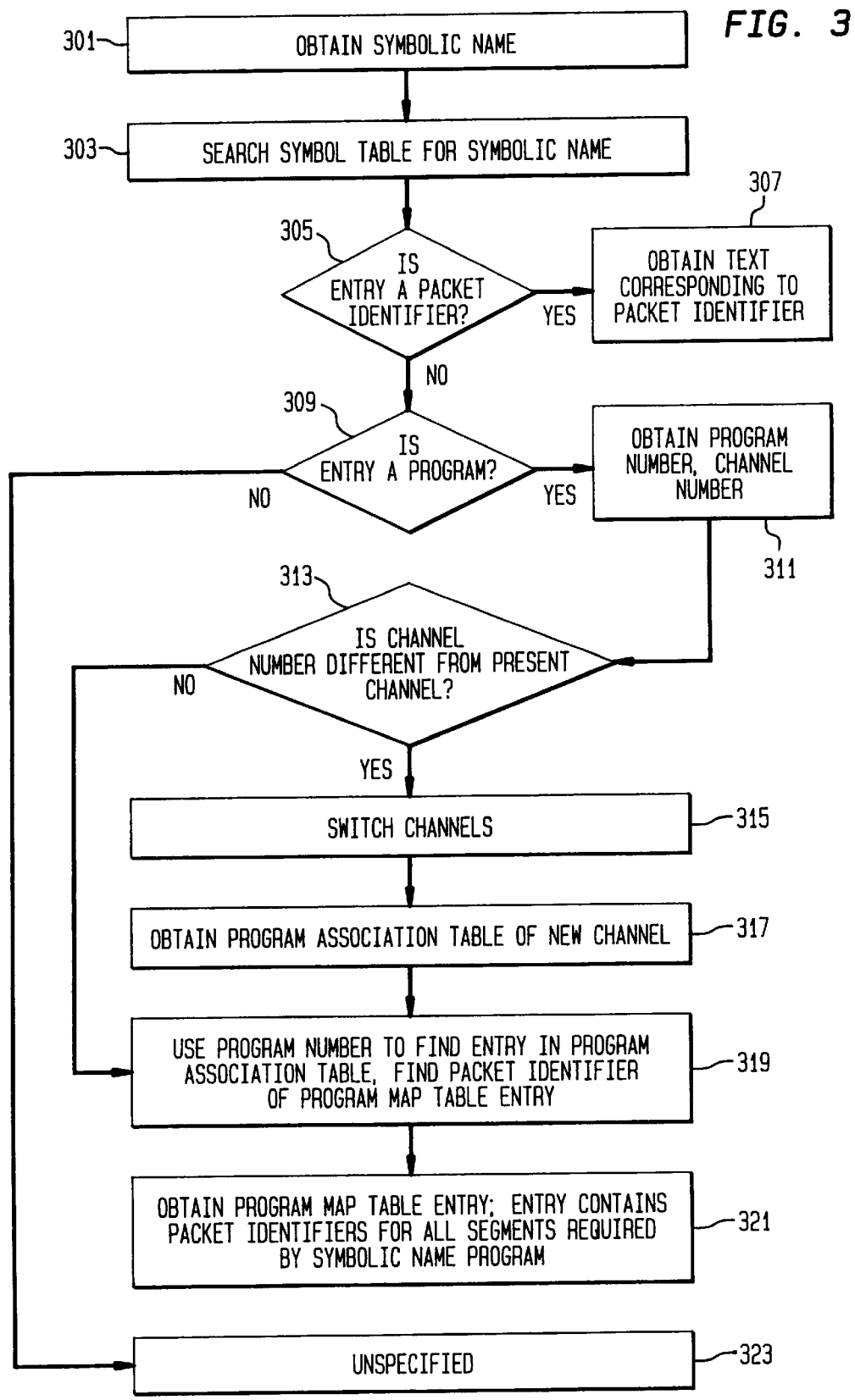
FIG. 3 is a flow diagram of a process for implementing applicant's invention.

FIG. 3 is a flow diagram illustrating the operation of applicant's invention. First, the symbolic name of a desired entity is specified (action block 301). This symbolic name can be obtained from a calling program and will, in fact, be encoded within that program for one of the data tables called by that program, or the symbolic name may be specified by a user in some interactive session with the set top terminal. The symbol table is searched for the symbolic name (action block 303). Test 305 is used to determine whether the entry directly specifies the packet identifier. If so, then the text corresponding to the packet identifier is obtained and the action is complete.

If the entry is not a packet identifier, then test 309 is used to determine if the entry is a program. If it is a program then the entry contains the identification of the program number and channel number. Test 313 is then used to determine if the channel number is different from the present channel to which the set top terminal is tuned. If so, the set top terminal tunes to the specified channel number (action block 315). The set top terminal then contains a program association table of the new channel (action block 317). The set top terminal uses the program number to find an entry in the program association table (action block 319). The set top terminal then finds in that entry the packet identifier of a program map table entry. The set top terminal then obtains the program map table entry for that program (action block 321). The entry contains packet identifiers for all segments required by the program. Examples are the video portion of an entertainment program, the audio portion of an entertainment program, the executable code of an application program, and data tables used by an application program. If the entry is neither a packet identifier nor a program then the symbolic table entry can be used to specify other actions or data not the subject of applicant's invention (action block 323 unspecified).

The above description is of one preferred embodiment of applicant's invention. Many other embodiments can be designed by those of ordinary skill in the art without departing from the scope of the invention. The invention is only limited by the attached clams.

I claim:

1. In a set top terminal for receiving a packetized broadband digital bit stream for providing data structures, program text and video programs to said set top terminal, a method of obtaining requested program text comprising the steps of:

transmitting on said bit stream program association data, program map data and data for a symbol table; and searching for a match between a symbol stored in a program, and a symbol in said symbol table in order to obtain data for accessing data or programs corresponding to said symbol in said symbol table;

wherein each symbol table entry comprises a symbol, the symbol comprising a variable length string of characters, the symbol used for searching for a symbol table entry and data corresponding to said symbol;

wherein a plurality of said symbol table entries each comprises a channel number and program number of a program corresponding to said symbol.

2. The method of claim 1 further comprising the steps of:

testing whether said channel number is equal to a number of a channel to which said set top terminal is tuned;

if said channel number is not equal to said number of a channel to which the set top terminal is tuned, tuning to a new channel identified by said channel number; and obtaining program association data and program map data for said new channel in order to access a program identified by said program number.

3. The method of claim 2 further comprising the step of:

changing data corresponding to a symbol;

whereby a different program on a different channel can be assigned to a symbol without changing the name of the symbol in a calling program.

4. The method of claim 1 wherein another of said symbol table entries comprises a packet identifier for identifying packets containing data corresponding to a symbol in said another of said symbol entry tables.

5. A set top terminal comprising:

means for receiving signals; and processor means for processing received signals;

said processor means operative under program control for:

receiving and storing program association data, program map data, and data for a symbol table; and searching for a match between a symbol stored in a program and a symbol in said symbol table in order to obtain data for accessing data or programs corresponding to said symbol in said symbol table;

wherein each symbol table entry comprises a symbol, the symbol comprising a variable length string of characters, the symbol used for searching for a symbol table entry, and data corresponding to said symbol;

wherein a plurality of said symbol table entries, each comprises a channel number and program number of a program corresponding to said symbol.

6. The set top terminal of claim 5 wherein said processor means is further operative under program control for:

testing whether said channel number is equal to a number of a channel to which said set top terminal tuned;

if said channel number is not equal to said number of a channel to which the set top terminal is tuned, tuning to a new channel identified by said channel number; and obtaining program association data and program map data for said new channel in order to access a program identified by said program number.

* * * * *